United States Patent [19]

Carter et al.

[11] 3,995,836
[45] Dec. 7, 1976

[54] MATERIAL MIXING AND FEEDING APPARATUS

[75] Inventors: Thomas M. Carter, Wayzata; Walter W. Wolfe, Mound, both of Minn.

[73] Assignee: Veda, Inc., Long Lake, Minn.

[22] Filed: Jan. 30, 1975

[21] Appl. No.: 545,505

[52] U.S. Cl. .................................... 259/6; 259/41; 259/DIG. 24
[51] Int. Cl.² .................... B01F 7/00; B01F 15/00; B01F 15/02
[58] Field of Search ............... 259/5, 6, 21, 40, 41, 259/97, 104, 178 R, DIG. 24, DIG. 31; 301/1, 125; 280/491 R; 222/410, 414, 238

[56] References Cited
UNITED STATES PATENTS

| | | | |
|---|---|---|---|
| 1,224,262 | 5/1917 | Bird | 301/125 |
| 1,708,947 | 4/1929 | Jaeger | 259/178 R |
| 2,661,958 | 12/1953 | Stokes | 301/125 X |
| 3,090,605 | 5/1963 | Copeland et al. | 259/104 |
| 3,388,929 | 6/1968 | Miley | 280/491 R X |
| 3,421,740 | 1/1969 | Behrens | 259/6 X |
| 3,638,920 | 2/1972 | Davis | 259/21 X |
| 3,688,827 | 9/1972 | Ryan | 259/97 X |
| 3,706,442 | 12/1972 | Peat | 259/41 |
| 3,765,704 | 10/1973 | Tierno | 280/491 R X |
| 3,797,807 | 3/1974 | Behrens | 259/41 |

Primary Examiner—Harvey C. Hornsby
Assistant Examiner—Robert Pous
Attorney, Agent, or Firm—Burd, Braddock & Bartz

[57] ABSTRACT

An open top box having a chamber for carrying particulate materials. An open grid covers the top of the box. A tongue and wheel assembly is removably connected to the base frame of the box. A plurality of augers removably located in the chamber rotate to mix and blend the materials in the chamber. Power transmitting structure mounted on the back of the box operates to rotate the augers. A material discharge conveyor attached to the side of the box operates to laterally discharge the mixed materials to a desired location.

28 Claims, 13 Drawing Figures

MATERIAL MIXING AND FEEDING APPARATUS

BACKGROUND OF THE INVENTION

Mobile mixing and unloading vehicles are used to carry, mix and discharge a mixture of particulate materials to a location such as an animal feed lot. This equipment includes box or hopper structures for carrying the material. Rotating augers are located in the box structures to tumble and thoroughly mix the materials in the box and continuously move the materials. Conveyor structures are used to move the materials from the box to a desired location. The box structures have been mounted on trucks and trailers, permitting them to be moved along the feed bunk of a feed lot and discharge materials into the feed bunk. Examples of bulk material blending and unloading vehicles are shown in U.S. Pat. Nos. 2,885,191; 3,090,605; 3,189,202; 3,197,075; and 3,215,408.

Box-type material blenders have open tops to provide an access for loading the material into the box. The materials are loaded into the box with conveyors, buckets and other material handling equipment. Large portions of material, such as hard or frozen materials, and foreign objects, such as rocks and lumber, can be easily placed into the box. These objects, when dumped into the box, will place severe bending loads on the mixing structure in the box and will prevent the effective operation of the mixing structure. The open top box is also a hazard to the operator as there is no safety structure to prevent the operator from accidentally falling into the box and being injured by the mixing structure.

The maintenance and repair of the blending apparatus occasionally requires the removal of the mixing structure from the box. This requires considerable time and labor as the box structure must be disassembled in order to permit the removal of the mixing structure. The material blenders for agricultural livestock feeds are used as mobile units to place the blended feed in a feeding location, as a feed bunk. The blenders are also used as stationary units in feed mixing areas. The blended feed is carried by conveyor to a bunk feeder or like feeding structure. The box structures of the blenders must be altered to accommodate a vehicle or trailer structure or the same box structure is not used on a mobile unit and a stationary unit.

SUMMARY OF THE INVENTION

The invention is broadly directed to an apparatus for mixing and blending particulate materials and discharging the materials to a desired location. The apparatus has box means defining a chamber for accommodating particulate materials. Material mixing and blending means located in the chamber of the box operates to mix the material into a uniform heterogeneous mixture. A conveyor is selectively operable to carry the material from the box to a discharge location.

One feature of the invention is the provision of an open grid means mounted over the open top of the box to prevent large objects from being dumped into the box and yet allowing the particulate material to be placed into the box. The open grid means also provides a safety barrier which prevents the personnel from accidentally falling into the box.

A further feature of the invention is the provision of releasable connector structure which mounts the material mixing means on the box. The connector structure permits the material mixing means, as augers, to be removed from the box without altering the box structure. The drive means for the mixing means is operably connected to the connector structure mounted on one of the walls of the box. The drive means is not altered or disconnected when the material mixing means are removed from the box.

An additional feature of the invention is the box structure having a base frame. A forwardly directed towing tongue is releasably connected to the base frame. Fasteners can be removed from the tongue and frame so that the tongue can be separated from the frame without altering the box structure. A transport wheel and axle assembly supports the box on a supporting surface. This assembly includes means to releasably connect it to the base frame. The wheel and axle assembly is releasably connected to the box frame with releasable fasteners so that the box and mixing structure, including the drive structure, is not altered when the wheel and axle assembly is removed from the frame. This permits the apparatus to be used as a stationary unit.

An object of the invention is to provide a material mixing and discharging apparatus operable to hold a plurality of particulate materials, continuously mix and blend the materials into a uniform heterogeneous mixture of materials, and discharge the mixture of materials to a desired location. Another object of the invention is to provide a material mixing and feeding apparatus that is safe and reliable in use, strong in construction, and has a long operating life with low maintenance. A further object of the invention is to provide a material mixing and discharging apparatus with an open top box having material mixing means and open grid means over the open top of the box to prevent large objects from being placed in the box, to prevent personnel from falling into the box, and to prevent material loading equipment from engaging the material mixing means and damaging the box. Yet another object of the invention is to provide a material mixing and discharging apparatus that is selectively usable as a mobile apparatus or a stationary apparatus. A further object of the invention is to provide a material mixing and discharging box with a removable towing tongue and a removable wheel and axle assembly so that the box is usable as a stationary unit without altering the structure of the box or the means to mix the materials in the box. Another object of the invention is to provide material mixing and discharge apparatus with auger assemblies that can be removed from the apparatus without altering or removing the box structure of the apparatus.

DESCRIPTION OF PREFERRED EMBODIMENT

Figure 1:
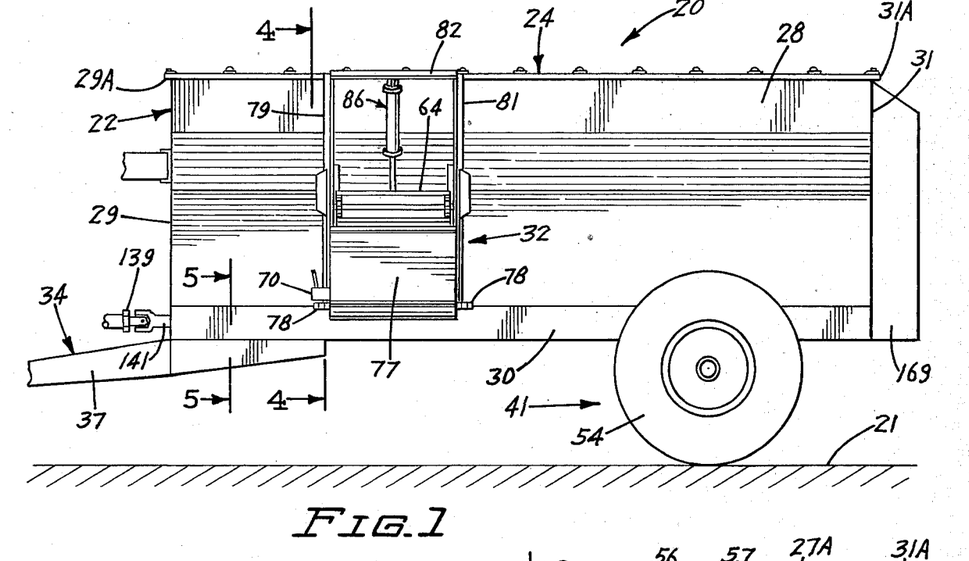
FIG. 1 is a side elevational view of the mixing and feeding apparatus of the invention.
Figures 2, 3:
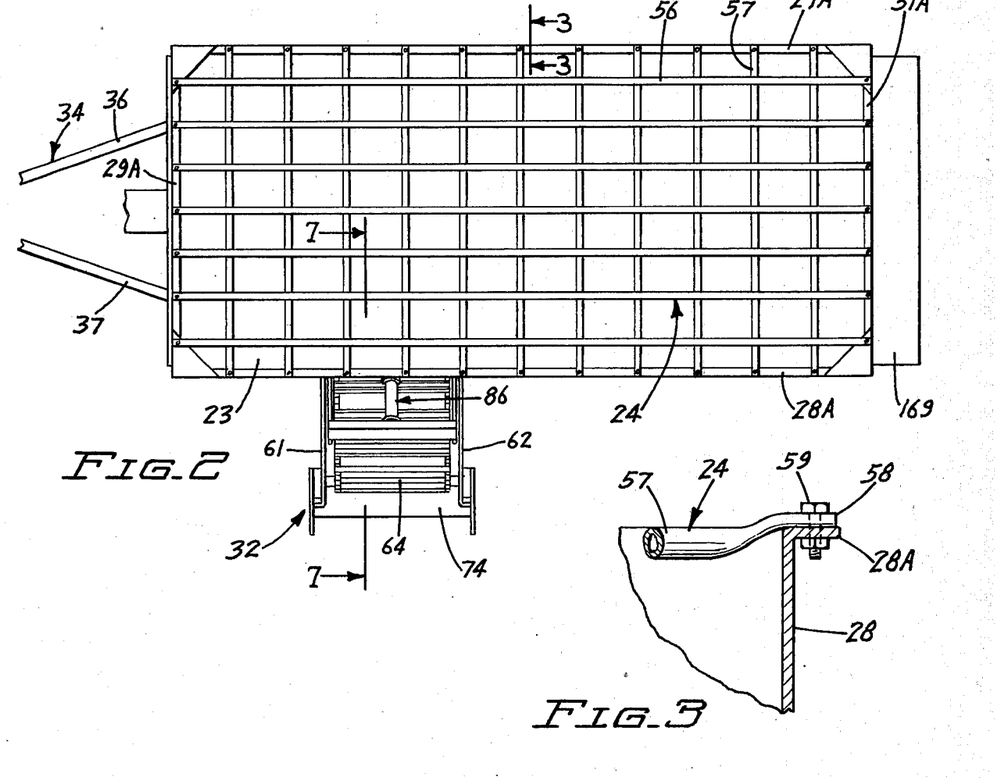
FIG. 2 is a top plan view of FIG. 1.
FIG. 3 is an enlarged sectional view taken along line 3—3 of FIG. 2.
Figure 4:
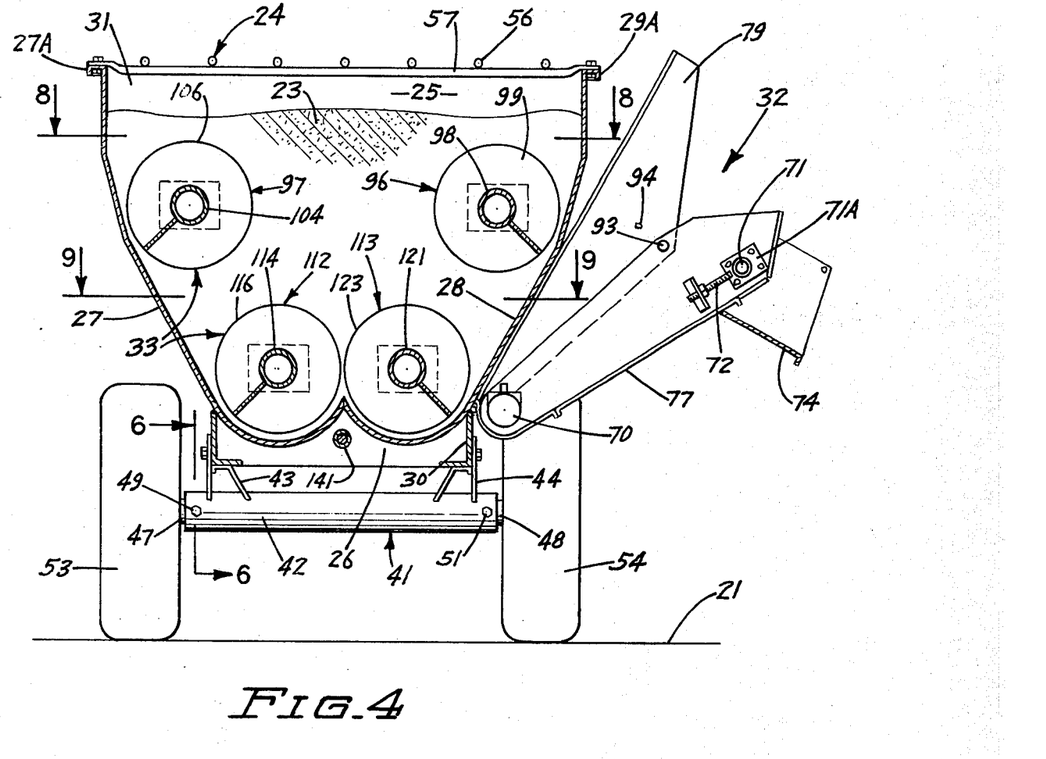
FIG. 4 is an enlarged sectional view taken along line 4—4 of FIG. 1.

Referring to FIGS. 1, 2 and 4, there is shown the mixing and discharging or feeding apparatus of the invention in the form of a wagon or trailer supported on a surface 21, as the ground. Apparatus 20 is operable to receive particulate materials, such as grain, silage, haylage, and other feed materials, and transport these materials to a discharge or feeding location. The materials are mixed in the apparatus 20 so that a number of materials can be thoroughly mixed with each other and fine and coarse materials are evenly dispersed with each other, providing a generally heterogeneous mixture of particulate materials. The following description is limited to an apparatus for mixing animal feed materials. It is apparent that other types of agricultural and non-agricultural particulate materials and granular materials, can be mixed, transported and discharged by apparatus 20.

The apparatus 20 has an open top box or hopper indicated generally at 22 having a chamber or compartment 25 for accommodating particulate materials 23, as grain, silage and the like. The open top of box 22 is covered with an open grill assembly indicated generally at 24 which prevents large objects from being loaded into the hopper or personnel from accidentally falling into the box chamber 25. Box 22 has a concave grooved base or floor 26 and upwardly and outwardly extended side walls 27 and 28. Floor 26 has a pair of longitudinal channels for accommodating lower augers 112 and 113. An upright front wall 29 closes the front of the box. In a similar manner, an upright back wall 31 closes the back of the box 22. The base 26 and walls 27, 28, 29 and 31 of box 22 are secured to a base frame 30. Frame 30 is made of right angle beams and has a rectangular box shape. The walls 27–31 have outwardly directed flanges 27A, 28A, 29A and 31A along their upper edges which reinforce the upper sections of the walls and provide support structure for the grill assembly 24.

A material discharge conveyor indicated generally at 22 is mounted on side wall 28 for receiving material from box chamber 25 and moving the material to a selected location, as a livestock feeding area or feed bunk. A material moving and mixing means, indicated generally at 33, is located within the chamber 25 below grill assembly 24. Material moving and mixing means 33 is longitudinally disposed in the box chamber 25 and is operable to move the material 23 in a continuous mixing pattern so that particulate materials of various kinds, sizes and densities will be thoroughly mixed and blended with each other.

Figure 5:
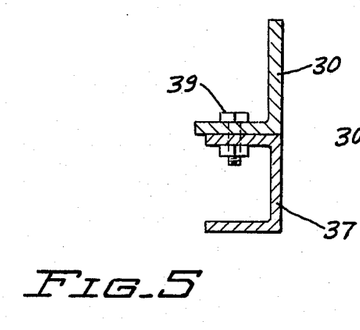
FIG. 5 is an enlarged sectional view taken along line 5—5 of FIG. 1.

A forwardly directed tongue indicated generally at 34 is secured to the forward end of the box 22. As shown in FIG. 2, tongue 34 comprises a pair of forwardly and inwardly converging beams 36 and 37. A hitch or clevis structure (not shown) is secured to the forward ends of beams 36 and 37. The rear sections of beams 36 and 37 are located under the opposite sides of the front of the base frame 30 of box 22. As shown in FIG. 5, nut and bolt assemblies 39 secure the beam 36 to the base frame 30. The nut and bolt assemblies 39 are removable whereby the tongue 34 can be removed from the frame 30. When tongue 34 is removed, the box can be used as a stationary unit in a feed room or feed mixing area.

Figure 6:
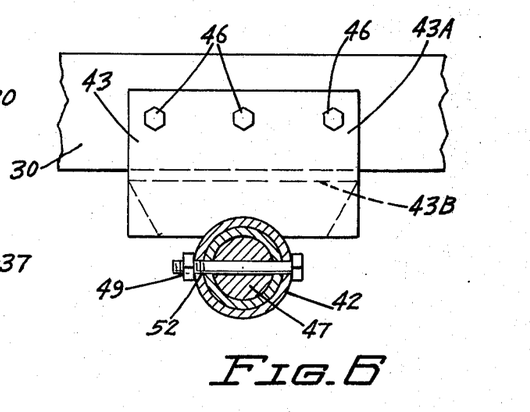
FIG. 6 is an enlarged sectional view taken along line 6—6 of FIG. 4.

A transport wheel and axle assembly, indicated generally at 41, is secured to the rear section of the box frame 30. Wheel and axle assembly 41 has a transverse tubular beam 42 connected to a pair of brackets or supports 43 and 44. The supports 43 and 44 are secured to opposite portions of the box frame 30 with a plurality of nut and bolt assemblies 46. As shown in FIG. 6, support 43 has an upright plate 43A and an inwardly directed plate or flange 43B. Plate 43A and flange 43B are secured by welds or the like to the beam 42. The plate 43A has a plurality of holes for accommodating the nut and bolt assemblies 46. Support 44 is constructed in a manner similar to bracket 43. Additional nut and bolt assemblies (not shown) attach the flange 43B to the box frame 30. The nut and bolt assemblies 46 can be removed so that the entire wheel and axle assembly 41 can be separated from the box frame 30. The box frame 30 can then be mounted directly on a supporting surface. Apparatus 20 is usable as a stationary unit without any alterations or changes to the box structure, the mixing structure or the discharge structure, since tongue 34 and transport wheel and axle assembly 41 are readily removable from the box frame 30.

A first fixed axle or spindle 47 is telescoped into one end of the tubular beam 42. In a similar manner, a second fixed axle or spindle 48 is telescoped into the opposite end of the tubular means. 42. A horizontal bolt 49 extends through aligned holes 52 in axle 47 and beam 42 to hold axle 47 in assembled relation with the beam 42. A bolt 51 extended through suitable holes in beam 42 and axle 48 holds the axle 48 in assembled relation with beam 42. A wheel 53, including a pneumatic flotation tire, is secured to the axle 47. A similar wheel 54 having a pneumatic flotation tire is secured to axle 48. Load sensing means, as strain gauges, are associated with axles 47 and 48. The strain gauges are included in an electronic circuit operable to provide readable information of the weight of the material in box chamber 25.

As shown in FIGS. 2 and 4, the open grill assembly 24 comprises a plurality of longitudinal members 56 and a plurality of transverse members 57. Members 56 extend longitudinally from the front wall to the back wall of the box and are generally parallel to each other. The transverse members 57 extend across the side walls of the top of the box and are secured to the opposite side walls of the box. The transverse members 57 are located below the longitudinal members 56. Transverse members 57 are generally parallel to each other and are equally spaced from each other from the front wall to the back wall. Preferably, adjacent members 56 and 57 are spaced 1 foot or 30 cm apart. As shown in FIG. 3, member 57 is a tubular member having a flattened end 58. A nut and bolt assembly 59 extends through a hole in end 58 and flange 28A to secure the member to the flange. Similar nut and bolt assemblies are used to secure the ends of members 56 and 57 to the flanges 27A, 28A, 29A and 31A.

Referring to FIGS. 1, 2, 4 and 7, the material discharge conveyor 32 extends laterally from the lower part of side wall 28. Conveyor 32 has a pair of upwardly and outwardly extending side plates 61 and 62. A transverse pan 63 is secured to the side plates 61 and 62 and provides a base or material supporting surface carrying an endless chain conveyor 64. Conveyor 64 comprises a pair of chains connected with a plurality of spaced transverse members 66. The lower ends of the chain are trained about drive sprocket 67. The upper ends of the chains are located about idler sprockets 68. The sprockets 67 are secured to a drive shaft 69. A hydraulic motor 70 is attached to the drive shaft to transmit driving power to the endless conveyor 64. Motor 70 is connected with lines or hoses to a source of fluid under pressure and controls for regulating the flow of fluid to the motor.

Figure 7:
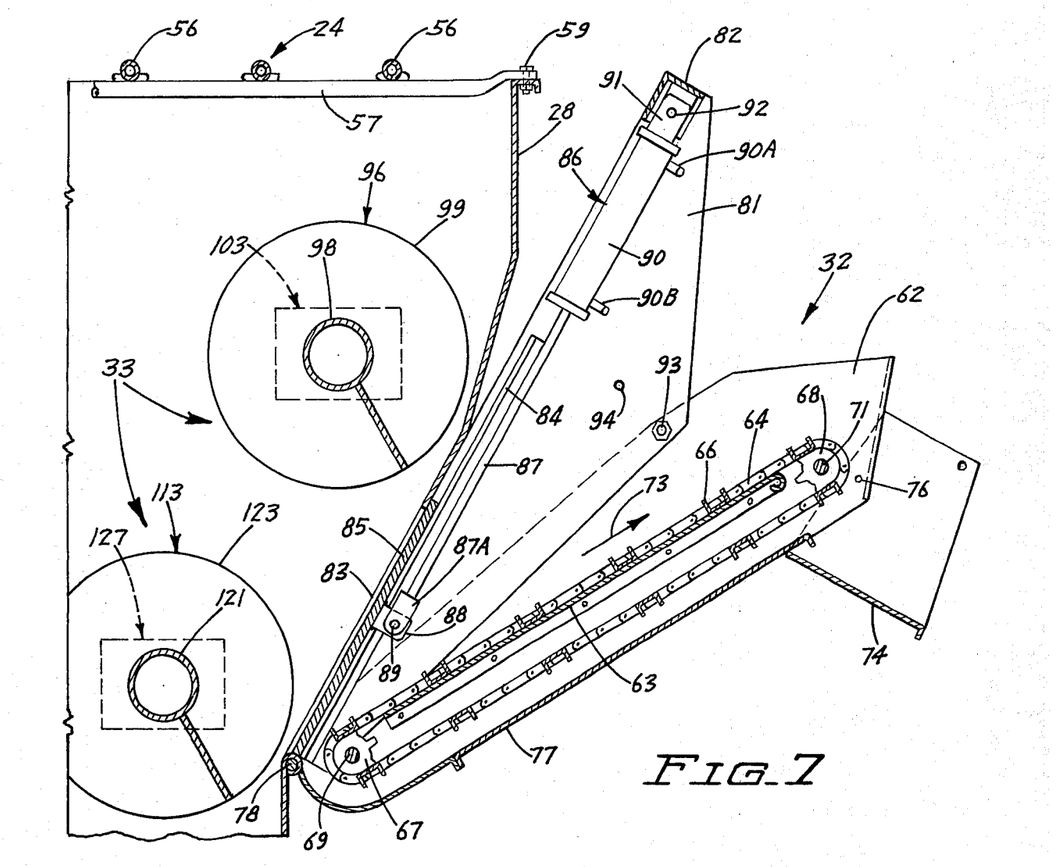
FIG. 7 is an enlarged sectional view taken along line 7—7 of FIG. 2.

The idler sprockets 68 are mounted on a transverse shaft 71. Opposite ends of shaft 71 are carried in adjustable bearings 71A, as shown in FIG. 4. The bearings are longitudinally adjustable with an adjusting bolt and nut assemblies 72 to place the conveyor 64 in tension. The hydraulic motor 70 operates to drive the conveyor 64 in the direction of arrow 73, as shown in FIG. 7. Conveyor 64 carries the material upward onto a discharge chute 74. Chute 74 is a generally U-shaped configuration and is pivotally connected to the outer end sections of the side plates 61 and 62 with suitable fasteners 76 such as nut and bolt assemblies. Chute 74 can be pivoted in an upward direction whereby the particulate material is discharged directly from the conveyor 64 to a desired location.

A flat bottom wall 77 is secured to the lower edges of the side plates 61 and 62 to protect the bottom run of conveyor 64. A hinge structure 78 pivotally mounts the lower end of bottom wall 77 to the lower part of side wall 28. As shown in FIG. 1, hinge 78 is located adjacent opposite sides of the bottom wall 77. Hinge 78 can be first tubular members secured to the box wall 28 and second tubular members secured to the bottom wall 77. A common rod extended through the first and second tubular members pivotally connects the conveyor 32 to the wall 28. Other types of hinge structures can be used to pivotally connect conveyor 32 to wall 28 or the base frame 30.

A pair of support plates 79 and 81 are extended upwardly from hinge 78. The support plates 79 and 81 are secured to the side wall 28 with suitable fasteners such as nut and bolt assemblies. A cross bar 82 is connected to the upper ends of plates 79 and 81. The support plates 79 and 81 are located adjacent opposite sides of an opening 83 in the lower part of box wall 28. Secured to and extended upwardly along the inside of support plates 79 and 81 are linear rails 84. The rails 84 are spaced outwardly from the box wall 28 to provide a channel for accommodating a generally flat door or gate 85. The gate 85 is of a size slightly larger than the opening 83 so that the gate 85 will close the opening. The rails 84 extend upwardly and permit gate 85 to be moved upwardly to open the opening 83. The gate 85 is moved from its open and closed positions with a double acting hydraulic cylinder indicated generally at 86. The cylinder 86 has a piston rod 87 carrying a generally U-shaped member 87A. An ear 88 secured to gate 85 extends between the U-shaped member 87A. A pin 89 connects the member 87A and the ear 88. The piston rod 87 extends upwardly into cylinder 90. Cylinder 90 has a head 91 connected to cross member 82 with a pin 92. Cylinder 90 is connected to a source of hydraulic pressure with suitable hydraulic lines 90A and 90B. The controls for the hydraulic fluid supply for the cylinder 87 and the hydraulic motor 70 can be mounted on the front of the box 25 or on the draft vehicle.

The side plates 61 and 62 are located adjacent the outsides of support plates 79 and 81, respectively. Suitable fasteners 93, such as nut and bolt assemblies, connect the side plate 61 with the support plate 79 and the side plate 62 with support plate 81. Support plates 79 and 81 have additional holes 94 for accommodating fasteners 93 whereby the angular position of discharge conveyor 32 can be changed and thereby alter the height or elevation of the out chute 74.

Figure 8:
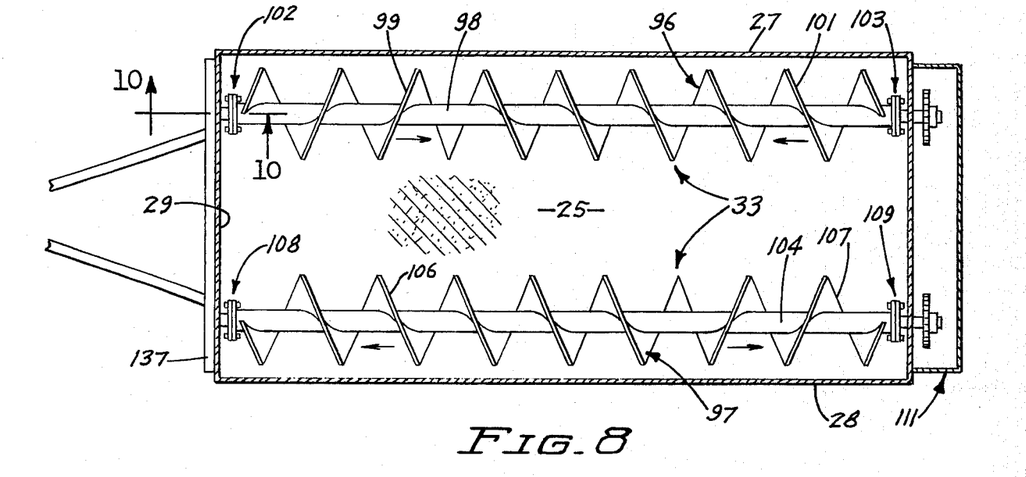
FIG. 8 is a sectional view taken along line 8—8 of FIG. 1.
Figure 9:
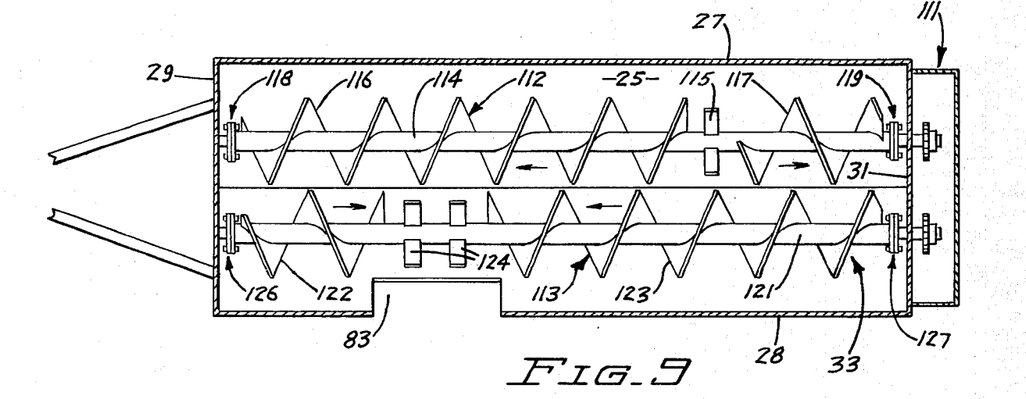
FIG. 9 is a sectional view taken along line 9—9 of FIG. 1.
Figure 10:
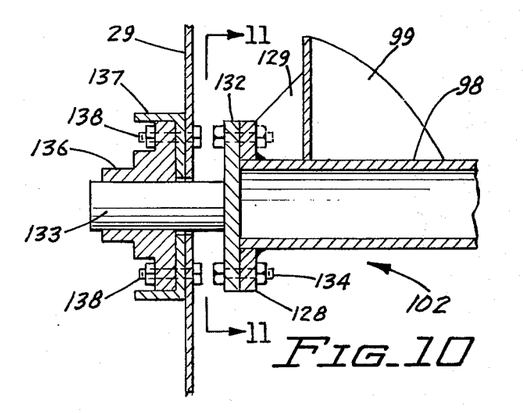
FIG. 10 is an enlarged sectional view taken along line 10—10 of FIG. 8.

Referring to FIGS. 8 and 9, there is shown the material moving and mixing means indicated generally at 33 located within chamber 25 of the box 22. The material moving and mixing means comprises a pair of upper longitudinal augers 96 and 97 extended between the front wall 29 and rear wall 31 adjacent the walls 27 and 28. Auger 96 has a longitudinal shaft 98. A pair of flight sections 99 and 101 are secured to the shaft. Flight section 99 extends from the front wall 29 toward section 101. In a similar manner, flight section 101 extends from the back wall 31 toward section 99. The flight sections 99 and 101 have reverse twists or reverse spiral patterns whereby they convey material away from the end walls 29 and 31 toward the central section of chamber 25. Adjacent ends of flight sections 99 and 101 are secured together. Section 101 has a longitudinal length about twice the length of section 99. Connectors indicated generally at 102 and 103 secured to the ends of shaft 98 removably movably support the auger 96 on shaft structure rotatably mounted on walls 28 and 31. The particular mounting structures for the shaft structures are shown in FIG. 10 and are hereinafter described.

Upper auger 97 has a longitudinal shaft 104 carrying separate flight sections 106 and 107. Flight sections 106 and 107 have opposite spiral patterns or reverse twists whereby the material is moved away from the walls 29 and 31 toward the central section of chamber 25. Adjacent ends of flight sections 106 and 107 are secured together. Section 106 has a longitudinal length about twice the length of section 107. Auger 96 is identical to and positioned parallel to auger 97, with auger 97 being located in an opposite operating position. Flight sections 99, 101, 106 and 107 have the same diameter. Connectors 108 and 109 removably secure the auger 97 to shaft structures rotatably mounted on bearings secured to walls 29 and 31. A drive assembly indicated generally at 111 is located behind rear wall 31 and is operable to rotate the augers 96 and 97 whereby the particulate material in chamber 25 is moved, mixed and blended in response to the rotation of flight sections 99, 101, 106 and 107. The material moves toward the center section of chamber 25 and toward side walls 27 and 28.

Referring to FIG. 9, a pair of lower augers 112 and 113 extend longitudinally in chamber 25. Augers 112 and 113 are located below and inwardly of the upper augers 96 and 97 as shown in FIG. 7. Augers 112 and 113 are parallel to augers 96 and 97.

Lower auger 112 has a longitudinal shaft 114. A pair of flight sections 116 and 117 are secured to the shaft 114. The lower portions of flight sections 116 and 117 are located in one groove in bottom wall 26. Flight sections 116 and 117 have opposite spiral patterns. A plurality of radial paddles 115 are secured to shaft 114 adjacent the inner ends of flight sections 116 and 117. Flight section 116 has a longitudinal length about twice the longitudinal length of flight section 117. The rotating auger 112 operates to move and mix the material toward the paddles 115. Paddles 115 kick or move the material toward the auger 113. Connectors 118 and 119 releasably secured to opposite ends of shaft 114 mount the shaft 114 on rotatable shaft and bearing structures carried by walls 29 and 31.

The second lower auger 113 has a lower portion located in the second groove of the bottom wall 26. Auger 113 has a longitudinal shaft 121. A first short flight section 122 is secured to the forward end of shaft 121. A second flight section 123 is secured to the rear part of shaft 121. Flight 123 has a longitudinal length about twice the longitudinal length of flight section 122. A plurality of pairs of outwardly directed paddles 124 are secured to shaft 121 between flight sections 122 and 123. The paddles 124 function to move or kick the material from chamber 25 out through the opening 83 so that the endless conveyor 64 can laterally discharge the material. Flight sections 122 and 123 have opposite helical turns or spiral patterns that function to carry the material toward paddles 124. Connectors 126 and 127 releasably mount the ends of shaft 124 to rotatable structure mounted on the walls 29 and 31. The drive assembly 111 is operatively connected to the shaft structure extended from the rear wall 31.

Each auger 96, 97, 112 and 113 has a short flight section and a long flight section having opposite helical twists and thus move material in opposite directions. The longitudinal length ratio between the long section and the short section is 2:1. The upper augers 96 and 97 are mounted in end-to-end positions so that the long flight section of one auger is laterally located relative to the short flight section of the other auger. The lower augers 112 and 113 are also mounted in end-to-end positions so that the long flight section of one auger is laterally located relative to the short flight section of the other auger. The short flight section 99 of auger 96 is above the long flight section 116 of auger 112. The long flight section 106 of auger 97 is above the short flight section 122 of auger 113. The long-short flight section arrangement of the augers 96, 97, 112 and 113 provides for an efficient material moving and mixing pattern having a considerable path or length. The path is in the nature of a figure eight. The four augers 96, 97, 112 and 113 have low power requirements to mix feed materials and produce a low thrust on the support bearings 136.

Figure 11:
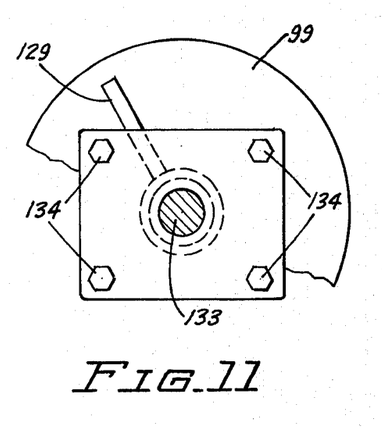
FIG. 11 is a sectional view taken along line 11—11 of FIG. 10.

Referring to FIGS. 10 and 11, there is shown the connector indicated generally at 102 for releasably connecting the end of auger shaft 98 to a rotatable structure mounted on wall 29. Connector 102 comprises a first plate 128 secured by means of welds or the like to the end of shaft 98. Plate 128 is located in a plane normal to the longitudinal or rotational axis of shaft 98. A gusset 129 is connected to plate 128 and the adjacent flight section 99. A second plate 132 is located adjacent the outside of plate 128. A longitudinal stub shaft 133 is secured to plate 132. A plurality of nut and bolt assemblies 134 extend through aligned holes in plates 128 and 132 to secure the plates 128 and 132 together. The stub shaft 133 is rotatably carried in a bearing 136. Bearing 136 is located between channel beam 137 secured to front wall 29. A plurality of nut and bolt assemblies 138 secure bearing 136 to beam 137.

The connectors 103, 108, 109, 118, 119, 126 and 127 are of the same construction as connector 102. The connectors 103, 109, 119 and 127 support the rear ends of the augers. The drive assembly 111 is drivably connected to the stub shafts of the rear connectors.

The augens 96, 97, 112 and 113 can be removed from the box 22 without altering or removing any of the box structure. The open grill assembly 24 is initially removed from the top of the box to expose the augers. The nut and bolt assemblies 134 are removed so that the augers 96, 97, 112 and 113 can be lifted from the box chamber 25.

Figures 12, 13:
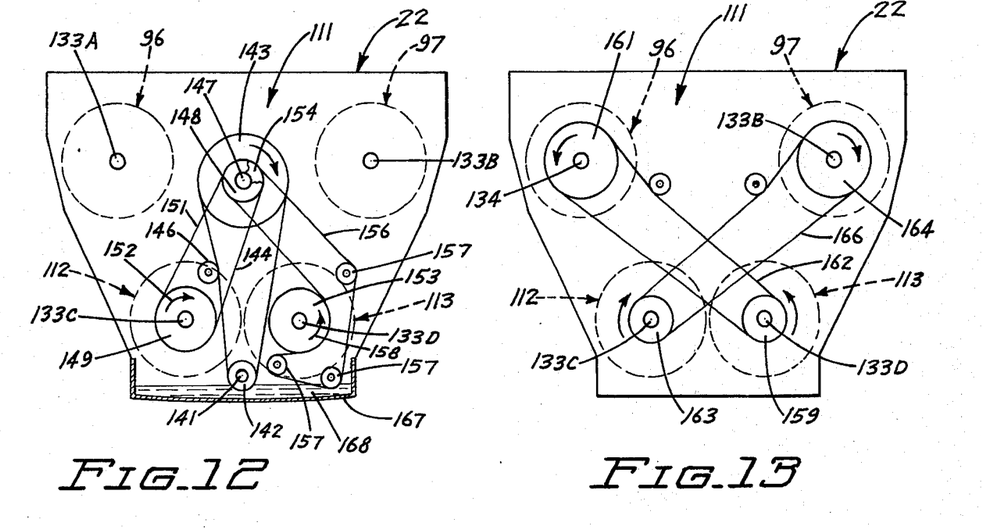
FIG. 12 is a rear elevational view of the apparatus diagrammatically showing the drive structure of the lower augers.
FIG. 13 is a rear elevational view of the apparatus diagrammatically showing the drive structure for the upper augers.

Referring to FIGS. 12 and 13, there is shown a diagrammatic view of the drive assembly indicated generally at 111 for rotating the upper augers 96 and 97 and the lower augers 112 and 113. The power is derived from a power takeoff drive unit 139 shown in FIG. 1. The power is transmitted through drive shaft 141 extended longitudinally through the base frame 30 of the box and is supported thereon with suitable bearings (not shown). A drive sprocket 142 is secured to the rear end of shaft 141. The sprocket 142 is in alignment with a large driven sprocket 143 mounted on a shaft 147. A roller chain 144 drivably connects the sprocket 142 with the sprocket 143. The chain 144 cooperates with idler sprocket 146. The shaft 147 also carries a first sprocket 148 and a second sprocket 154. Sprocket 148 is in alignment with a sprocket 149 mounted on the stub shaft 133C for the auger 112. A chain 151 drivably connects sprocket 148 and sprocket 149. The sprocket 149 is driven in the direction of arrow 152. A sprocket 153 is drivably mounted on the stub shaft 133D for the auger 113. A roller chain 156 connects sprockets 153 and 154. Chain 156 is trained about a plurality of idler spockets 157 and operates to drive sprocket 153 in the direction of arrow 158. Sprocket pairs 148 and 149 and 153 and 154 have the same size ratios so that the augers 112 and 113 rotate at substantially the same speed.

Referring to FIG. 13, the upper augers 96 and 97 are driven with chain and sprocket drives from the lower augers 112 and 113. Auger 96 is drivably connected to auger 113 with a sprocket 159 mounted on the stub shaft 133D and a sprocket 161 mounted on stub shaft 133A. A roller chain 162 connects the sprockets 159 and 161. Auger 97 is connected to auger 112 with a chain sprocket drive. The drive includes a sprocket 163 mounted on stub shaft 133C and a sprocket 164 mounted on the stub shaft 133B. A roller chain 166 connects the sprockets 163 and 164. The sprocket sizes are such that the top augers 96 and 97 rotate faster than bottom augers 112 and 113. This insures a constant and even mixing of the particulate material in box chamber 25.

The chain and sprocket drive assemblies are constantly lubricated. As shown in FIG. 12, the sprocket 142 and one of the idler sprockets 157 are located in a pan 167 containing lubricating oil 168. The pan 167 forms the bottom wall of a housing 169 which encloses the drive assembly 111. Housing 169 is attached to the rear wall 131 of the box 22.

In use, material loading machines having buckets and the like are used to pick up particulate material such as silage and grain and dump the material into the box chamber 25. The particulate may occasionally contain large objects which, if placed in box chamber 25, would damage the material moving and mixing means 33. The open grill assembly 24 functions as a sieve to prevent the introduction of large objects into box chamber 25.

The grill assembly 24 also functions as a shield or barrier to prevent loading equipment from damaging the box and top augers and prevent personnel from falling into the box chamber 25. The grill assembly 24, being fixedly secured to the top portions of the side wall, cannot be readily removed so that its function will not be impaired.

The augers 96 and 97 and 112 and 112 are rotated with the operation of drive assembly 111. The power takeoff shaft is connected to the towing vehicle to introduce power to the drive assembly 111. The rotating augers 96, 97, 112 and 113 move the particulate material in a continuous flow and mixing pattern similar to a figure eight pattern.

The mixed particulate material is discharged from box 22 with the use of discharge conveyor 32. Initially, the double acting hydraulic cylinder 86 is operated to open the door 85. This provides a discharge opening 83 in the box side wall 28 through which the material is discharged onto conveyor 64. The hydraulic motor 69 operates to move the conveyor 64 and thereby carry the material to the out chute 74. Out chute 74 directs the material to a desired location, such as an animal feed bunk. The box 22 can be moved so that the material is discharged in an elongated ribbon in a bunk feeder. The material can be discharged in other locations and without moving the box.

In the event that it is necessary to remove and replace an auger, the grill assembly 24 is first removed from box 22. The auger is then disconnected at its connectors, as connectors 102 and 103, to permit the auger 96 to be removed vertically from the box chamber 25. The connectors are released by removing the nut and bolt assemblies 134.

The mixing and feeding apparatus 20 can be used as a stationary unit without altering the box or the material moving and mixing structure. This is accomplished by removing tongue 34 from box frame 30. Nut and bolt assemblies 39 are released so that the beams 36 and 37 can be separated from the box frame 30. The wheel and axle assembly 41 is removed from box frame 30 by removing the nut and bolt assemblies 46. The box frame 30 can then be mounted on a fixed support. The power takeoff drive unit 139 can be replaced with a suitable electric motor or gasoline engine operable to provide power to drive shaft 141.

While there has been shown and described a preferred embodiment of the invention, it is understood that changes in the size, location of the structures and types of augers and conveyors may be made by those skilled in the art without departing from the invention.

The embodiments of the invention in which an exclusive property or privilege is claimed are defined as follows:

1. An apparatus for mixing particulate materials comprising: box means having upright front and rear end walls and and side walls surrounding a chamber for accommodating particulate materials, one of said side walls having a discharge opening located between the ends of the one side wall, said box means having an open top whereby the particulate materials can be placed in the chamber, auger means mounted on the box means and located in the chamber to mix the particulate materials in the chamber, said auger means including first and second lower augers and third and fourth upper augers extended between front and rear end walls, said first and second augers being located in the bottom section of the chamber and said third and fourth augers being located above the first and second augers and positioned generally parallel to the first and second augers, each of said first, second, third and fourth aguers having two spiral flights with opposite spiral patterns, said first auger having a first spiral flight operable to move material from the front end wall toward the discharge opening and second spiral flight operable to move material from the rear end wall to the discharge opening, said second auger having a first spiral flight and a second spiral flight operable to move material from the midsection of the chamber toward the front and rear end walls, said third and fourth augers each having first and second spiral flights, one of said third and fourth augers being operable to move material from the front and rear walls toward the midsection of the chamber, the other of said third and fourth augers being operable to move material from the midsection to the front and rear end walls, drive means for rotating the first and second augers in opposite directions and for rotating the third and fourth augers in opposite directions, open means mounted on the box means and located over the entire open top of the box means to prevent large objects from entering the chamber and allowing particulate materials to be placed in the chamber, and door means for selectively opening and closing the discharge opening whereby particulate materials are discharged from the chamber when the door means is open.

2. The apparatus of claim 1 wherein: the open means includes open grid structure having spaced side-by-side longitudinal members and spaced side-by-side transverse members.

3. The apparatus of claim 1 wherein: the upright side walls and upright end walls, have top sections, said open means including a plurality of laterally spaced longitudinal members secured to the top sections of the end walls and a plurality of laterally spaced transverse members secured to the top sections of the side walls.

4. The apparatus of claim 3 wherein: the longitudinal members and transverse members are tubular members.

5. The apparatus of claim 1 wherein: the first auger has at least one outwardly directed radial paddle located between the first and second spiral flights on the first auger.

6. The apparatus of claim 1 wherein: the second spiral flight of the first auger is longer than the second spiral flight of the second auger, said second spiral flight of the first auger having an intermediate portion located adjacent an inside end portion of the first spiral flight of the second auger.

7. The apparatus of claim 6 wherein: the first auger has a plurality of outwardly directed radial paddles located between the first and second spiral flights.

8. An apparatus for mixing particulate materials comprising: box means having a chamber for accommodating particulate materials, means mounted on the box means and located in the chamber for mixing the particulate materials in the chamber, means for selectively discharging particulate materials from the chamber, said box means having a side wall with a discharge opening, an upright first end wall and an upright second end wall, said means for mixing the particulate material including auger means extended between said end walls, said auger means including first and second lower augers located in the bottom section of the chamber and third and fourth upper augers located above and positioned generally parallel to the first and second augers, each of said first, second, third and fourth augers having two spiral flights with opposite spiral patterns, said first auger having a first spiral flight operable to move material from the first end wall toward the discharge opening and a second spiral flight operable to move material from the second end wall toward the discharge opening, said second auger having a first spiral flight and a second spiral flight operable to move material from the midsection of the chamber toward the first and second end walls, said third and fourth augers each having first and second spiral flights, one of said first and second spiral flights of the third and fourth augers operable to move material from the opposite end walls toward the midsection of the chamber, the other of said first and second flights of the third and fourth augers operable to move material from the midsection toward the first and second end walls, and connector means releasably attached to the ends of said augers for mounting the augers on said end walls whereby the augers can be removed from the apparatus, and drive means operably connected to the connector means on one end wall for rotating the first and second augers in opposite directions and the third and fourth augers in opposite directions thereby mixing the particulate materials in the chamber.

9. The apparatus of claim 8 wherein: the first auger has at least one outwardly directed radial paddle located between the first and second spiral flights of said first auger.

10. The apparatus of claim 9 wherein: the second spiral flight of the first auger is longer than the second spiral flight of the second auger, said second spiral flight of the first auger having an intermediate portion located adjacent an inside end portion of the first spiral flight of the second auger.

11. The apparatus of claim 8 wherein: each connector means includes a first upright plate secured to an end of each auger, a second upright plate located adjacent the first plate, releasable means connecting the first plate with the second plate, shaft means secured to the second plate, and bearing means on the end wall rotatably carrying the shaft means.

12. The apparatus of claim 8 wherein: the second spiral flight of the first auger is longer than the second spiral flight of the second auger, said second spiral flight of the first auger having an inside end portion located adjacent an intermediate portion of the first spiral flight of the second auger, and said first auger having a plurality of outwardly directed radial paddles located between the first and second spiral flights of the first auger.

13. The apparatus of claim 8 wherein: said box means includes a base frame, tongue means releasably connected to the base frame and extended forwardly of the box means, a transport wheel and axle assembly for supporting the box means on a surface, and means releasably connecting the wheel and axle assembly to the base frame.

14. The apparatus of claim 13 wherein: the tongue means includes a pair of forwardly and inwardly converging beams, and releasable fastener means connecting the beams to separate portions of the base frame whereby the tongue means can be removed from the base frame.

15. The apparatus of claim 13 wherein: the means releasably connecting the wheel and axle assembly to the base frame includes support means and releasable fasteners connecting the support members to the box frame whereby the wheel and axle assembly can be removed from the base frame.

16. The apparatus of claim 15 wherein: the support members each include an upright member located adjacent a side of the box frame and a generally horizontal member adjacent the bottom of the box frame, and releasable fastener means connecting the upright members and horizontal members to the box beam.

17. The apparatus of claim 16 wherein: the wheel and axle assembly includes a transverse tubular beam secured to the support members, axle means projected into opposite ends of the tubular beams, means releasably connecting the axle means to the tubular beam, and wheel means rotatably mounted on the axle means for supporting the apparatus on a surface.

18. An apparatus for mixing particulate materials comprising: box means having front and rear end walls and a side wall including a material discharge opening, said walls defining a chamber for accommodating particulate materials, auger means mounted on the end walls and located in the chamber to mix the particulate materials in the chamber, means for selectively discharging particulate materials from the chamber, said auger means including first and second lower augers positioned in the lower portion of said chamber and third and fourth augers located above the first and second augers and positioned generally parallel to the first and second augers, each of said first, second third and fourth augers having two spiral flights having opposite spiral patterns, said first auger having a first spiral flight operable to move material from one end wall toward the discharge opening and a second spiral flight operable to move material from the other end wall to the discharge opening, said second auger having a first spiral flight and a second spiral flight operable to move material from the midsection of the chamber toward the front and rear end walls, said third and fourth augers each having first and second spiral flights, one of said first and second spiral flights of the third and fourth augers operable to move material from the end walls toward the midsection of the chamber, the other of said first and second spiral flights of the third and fourth augers operable to move material from the midsection to the front and rear end walls, drive means for rotating the first and second augers in opposite directions and for rotating the third and fourth augers in opposite directions, said box means having a base frame, tongue means releasably secured to the base frame and extended forwardly of the box means, a transport wheel and axle assembly for supporting the box means on the surface, said assembly having support members releasably mounted on the base frame, and releasable fastener means connecting the support members to the box frame whereby the wheel and axle assembly can be removed from the base frame.

19. The apparatus of claim 18 wherein: the tongue means includes a pair of forwardly and inwardly converging beams, and releasable fastener means connecting the beams to separate portions of the base frame whereby the tongue means can be removed from the base frame.

20. The apparatus of claim 18 wherein: the support members each include an upright member located adjacent a side of the box frame and a generally horizontal member located adjacent the bottom of the box frame, and releasable fastener means connecting the upright members and horizontal members to the box beam.

21. The apparatus of claim 20 wherein; the wheel and axle assembly includes a transverse tubular beam secured to the support members, axle means projected into opposite ends of the tubular beams, means releasably connecting the axle means to the tubular beam, and wheel means rotatably mounted on the axle means for supporting the apparatus on a surface.

22. An apparatus for mixing particulate materials comprising: box means having end walls and a chamber for accommodating particulate materials, means mounted on the box means and located in the chamber to mix the particulate materials in the chamber, means for selectively discharging particulate material from the chamber, said means to mix the particulate materials including a pair of upper augers and a pair of lower augers, said lower augers each having a first spiral flight and a second spiral flight, said second spiral flight having a reverse twist from the first spiral flight, said first spiral flight of one of the lower augers being longitudinally longer than the second spiral flight of the other lower auger, said upper augers comprising a first auger having first and second spiral flights operable to move material from the midsection of the chamber toward the end walls, and a second auger having first and second spiral flights operable to move material from the end walls toward the midsection of the chamber, and drive means operable to rotate the lower augers in opposite directions and to rotate the upper augers in opposite directions.

23. The apparatus of claim 22 wherein: the first spiral flight of one of said lower augers has a longitudinal length about two times the longitudinal length of the second spiral flight of one of said lower augers.

24. The apparatus of claim 22 wherein: the first spiral flight of the first upper auger and the second spiral flight of the second upper auger have substantially the same longitudinal length.

25. The apparatus of claim 22 wherein: the second spiral flight of the first lower auger is longer than the second spiral flight of the second lower auger, said second spiral flight of the first lower auger having an inside end portion located adjacent an intermediate portion of the first spiral flight of the second lower auger.

26. The apparatus of claim 25 wherein: the first lower auger has a plurality of outwardly directed radial paddles located between the first and second spiral flights of said first lower auger.

27. The apparatus of claim 22 wherein: the first spiral flight and second spiral flight of said first and second upper augers are longitudinally spaced from each other.

28. The apparatus of claim 22 wherein: one of said lower augers has outwardly directed paddle means located between the first spiral flight and the second spiral flight thereof.

* * * * *

UNITED STATES PATENT AND TRADEMARK OFFICE
CERTIFICATE OF CORRECTION

PATENT NO. : 3,995,836
DATED : December 7, 1976
INVENTOR(S) : Thomas M. Carter et al It is certified that error appears in the above–identified patent and that said Letters Patent are hereby corrected as shown below:

Column 8, line 6, "augens" should be --augers--.

Column 9, line 8, "112" second occurrence, should be --113--.

Column 10, line 4, "aguers" should be --augers--.

Signed and Sealed this

Twelfth Day of April 1977

[SEAL]

Attest:

RUTH C. MASON
*Attesting Officer*

C. MARSHALL DANN
*Commissioner of Patents and Trademarks*